United States Patent [19]

Dyer

[11] Patent Number: 5,150,355
[45] Date of Patent: Sep. 22, 1992

[54] RELATING EXCHANGES

[76] Inventor: Nigel P. Dyer, Glebelands, 1 St. Michael's, Church Road, Liverpool, L17 7BD, England

[21] Appl. No.: 501,531

[22] Filed: Mar. 28, 1990

[30] Foreign Application Priority Data

Mar. 31, 1989 [GB] United Kingdom ................. 8907315

[51] Int. Cl.⁵ .................... H04G 11/04; H04J 1/16; H04J 3/14
[52] U.S. Cl. ..................................... 370/16; 370/58.1
[58] Field of Search ................. 370/16, 13, 58.1, 58.2, 370/58.3, 65.5

[56] References Cited

U.S. PATENT DOCUMENTS

| | | | |
|---|---|---|---|
| 4,473,900 | 9/1984 | Belforte et al. | 370/65.5 |
| 4,853,957 | 8/1989 | Seeger et al. | 370/16 |
| 4,866,700 | 9/1989 | Berry et al. | 370/58.1 |
| 5,014,264 | 5/1991 | Nagler et al. | 370/16 |

Primary Examiner—Douglas W. Olms
Assistant Examiner—Wellington Chin
Attorney, Agent, or Firm—Fleit, Jacobson, Cohn, Price, Holman & Stern

[57] ABSTRACT

An electronic cross connect frame for an exchange or a multiplexor therefor is provided in which an analogue access matrix is provided for providing a limited number of spare cards or different cards to which any of the lines may be switched to provide a "sparing" or alternative services.

13 Claims, 4 Drawing Sheets

RELATING EXCHANGES

BACKGROUND OF THE INVENTION

This invention concerns exchanges of the kind having a distribution frame and subscriber interface cards. There is a growing need to provide an analogue switch facility between the distribution frame and the interface cards within the exchange or in a multiplexor of the exchange. Such an analogue switching facility is sometimes called an Electronic Cross Connect Frame (ECCF). An ECCF permits "sparing" (the continued provision of service to a subscriber whose interface card has failed by switching the subscriber to a spare interface card) and also alternative service provision e.g. when a subscriber requests a service provided only by a different physical interface circuit which can only be provided immediately by the network operator switching in a different interface card.

Ideally, a network operator would be able immediately to switch any subscriber to any of the different types of interface cards provided within the exchange or its multiplexor. However, such an ECCF would not be cost effective with present or forseeable technology.

For example, for an exchange (or multiplexor) with 900 subscriber lines for which the connections may be of the 2-wire or 4-wire type, then a three stage switching matrix of the kind shown in FIG. 1 of the accompanying drawings would be necessary to provide such complete interconnectivity. Each indicated line may represent a 4-wire connection. The matrix would then be constituted by 144566 four pole switches. Using relays, with their associated circuit boards, edge connectors, drivers etc., the cost would be in excess of $230 per line and the volume would be considerable.

As an alternative approach, if separate non-interconnecting but fully available switches are implemented for modules each of 60 subscriber lines, the number of switches required would be 33880 four pole switches. Again, the cost for a 900 line exchange would be prohibitive.

If the switching matrix was implemented with solid-state cross points, the volume (but not to any great extent, the cost) would be reduced. For example, either gated diodes or high voltage FETs (Field Effect Transistors) may be used instead of relays. Gated Diodes, for three stage switching, would have a path resistance of approximately 100 ohms. High voltage FETs are prohibitively expensive. It is difficult also to provide well matched impedances using such devices (a balance about earth of some 70 ohms).

It is an object of the present invention to provide an electronic cross connect frame, for use in an exchange or a multiplexor of an exchange, wherein the foregoing disadvantages are minimised.

SUMMARY OF THE INVENTION

According to the present invention, there is provided an electronic cross connect frame, for an exchange or a multiplexor thereof, comprising an analogue access matrix having an integral number n+x of subscriber line interfaces and an integral number n of interface connections to a distribution frame, the matrix being capable of switching, on a one-one basis, up to 2x of the subscriber line interfaces to any of the interface connection to the distribution frame, and control means associated with the matrix for switching a subscriber line interface to an interface connection to the distribution frame and for mapping the paths from the subscriber line interfaces to the interface connections to the distribution frame.

It is preferred that the or each analogue access matrix comprises two switch planes.

For 4-wire inputs, a first pair of wires may be switched in the first switch plane and the other pair of wires may be switched in the second switch plane. In such case, the switch planes may be identical.

For 2-wire inputs, the two planes may also be identical, the second switch plane paralleling the first switch plane. Alternatively, the second switch plane may serve for selective connection of a ring source to a redundant pair of lines for a particular path through the matrix.

Test access relays may tap into a subscriber pair of lines so as not to interrupt the lines. Independant splitting relays are employed to break the connection between the subscriber and the line cards. In this way two stage circuit validation may be achieved.

Where the second switch plane is identical to the first, it may parallel the same for 2-wire lines. In this way, either switch plane could be removed without interrupting services to the subscribers of the particular module using that analogue access matrix.

BRIEF DESCRIPTION OF THE DRAWINGS

The invention will be described further, by way of examples, with reference to the accompanying drawings, in which.

DESCRIPTION OF THE PREFERRED EMBODIMENT

Figure 1:
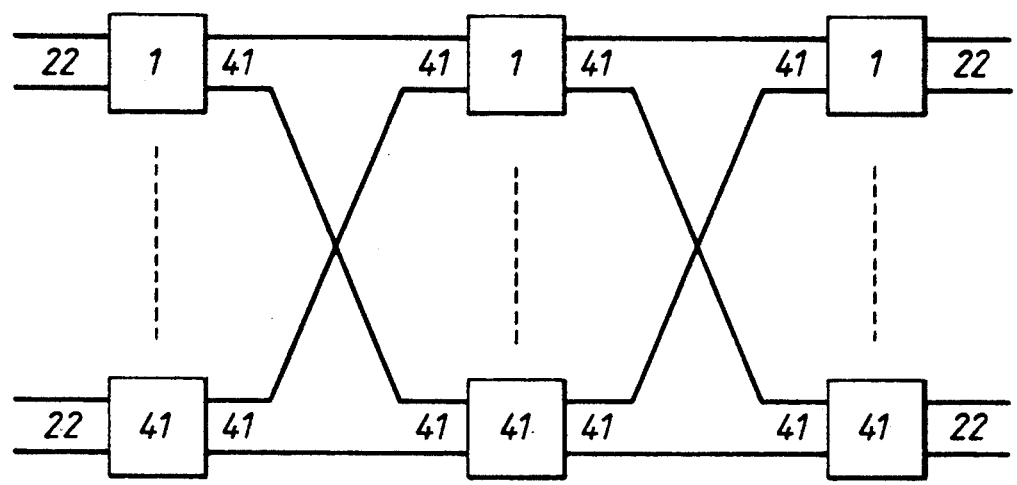
FIG. 1, as above described, represents a three stage switching matrix representing a conventional way of providing "sparing" or alternative subscriber service.
Figure 2:
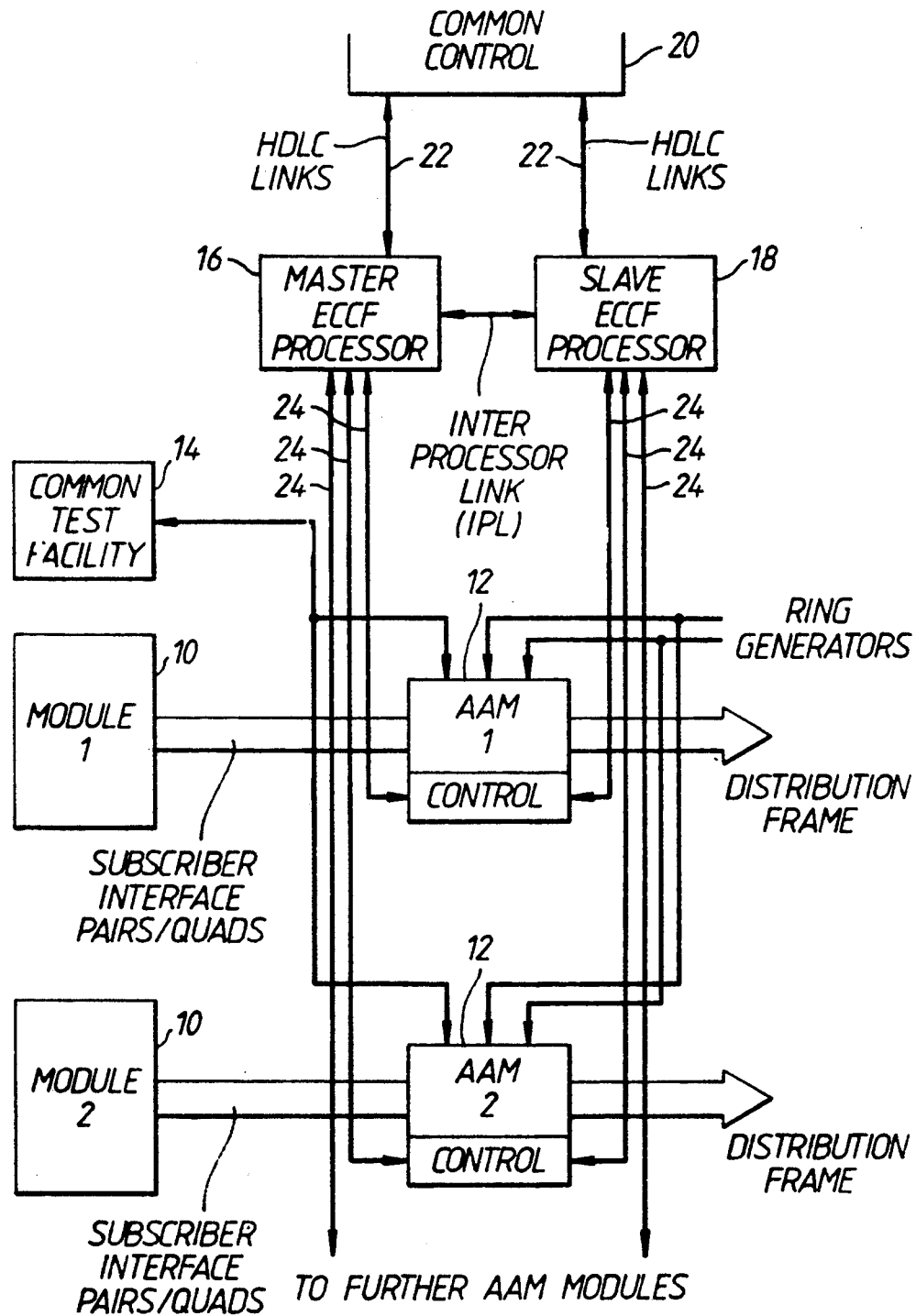
FIG. 2 is a block diagram of an electronic cross connect frame, for use in an exchange or a multiplexor thereof, according to the present invention.

Referring to the drawings, FIG. 2 shows a block diagram of a proposed electronic cross connect frame (ECCF). The incoming subscriber lines are assigned to modules 10. Each module 10 comprises an Analogue Access Matrix (AAM) 12, for each module 10 of subscriber interface circuits. In this description, each module consists of n+x e.g. 64 line interface circuits and is used to provide service to up to n e.g. 60 subscribers at any given time, and excess lines x=4 being available for sparing etc. The interfaces may be 2-wire or 4-wire.

The AAM 12 normally provides direct interconnection between a Distribution Frame (not shown) and Interface Circuits in the line modules 10. The AAMs 12 can also provide a limited number of flexibility cross connects, that is the ability to switch to spare line cards should an original line card develop a fault or to offer alternative service to a subscriber on a particular circuit. The AAMs 12 also provide the test access connection to a common test facility 14.

The AAMs 12 are controlled by two independent processors 16, 18 working in a master slave configuration, connected independently to a central exchange/multiplexor processor 20 via duplex communications links 22. Each Processor 16, 18 has independent control links 24 to each AAM 12.

Figure 3:
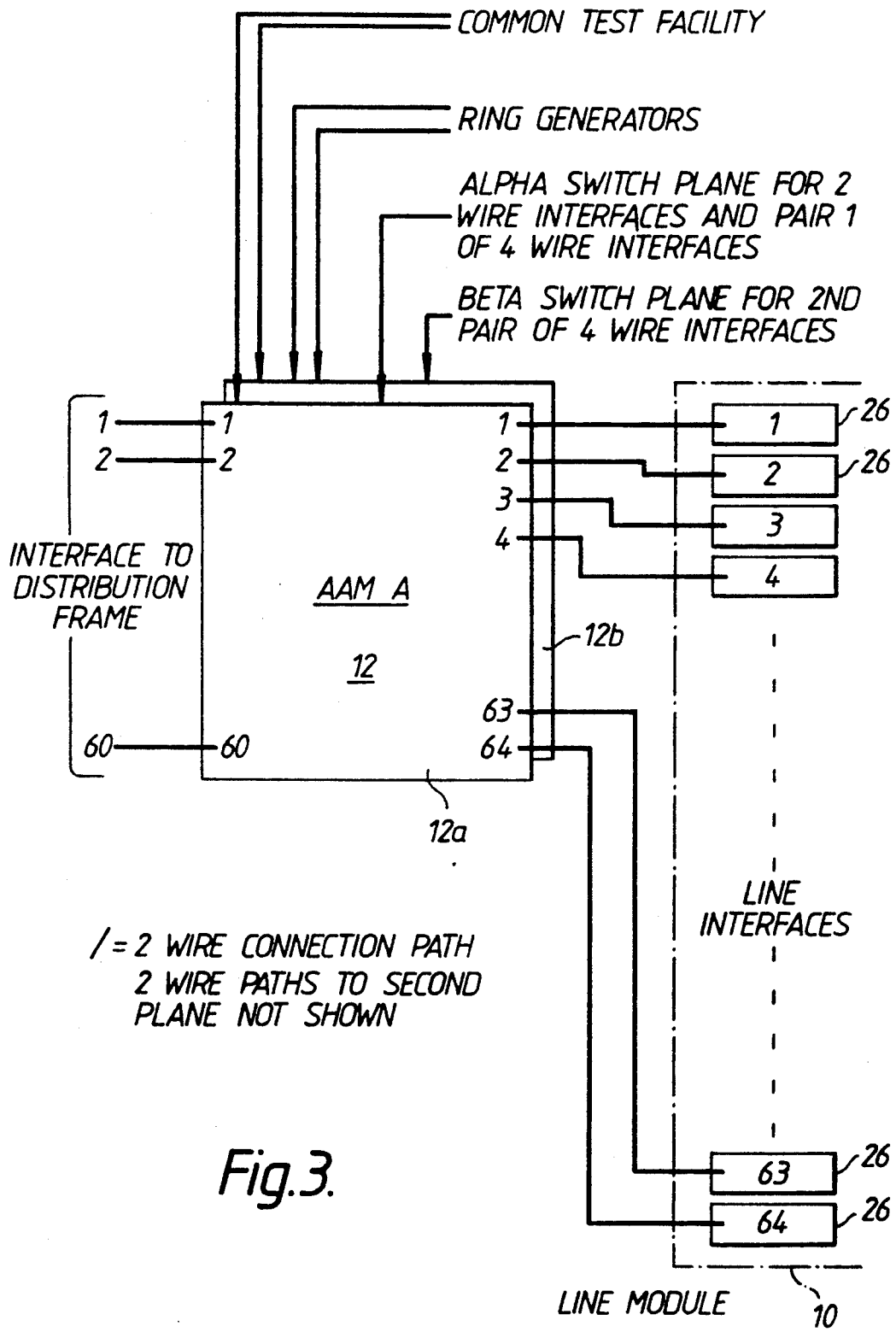
FIG. 3 is a block diagram illustrating the interconnection between an analogue access matrix and subscriber interfaces of one module of the electronic cross connect frame of FIG. 2; and, FIG. 4 is a schematic diagram of the structure of an analogue access module shown in FIGS. 2 and 3. It should be noted that FIGS. 3 and 4 are drawn on the opposite hand to FIG. 2, i.e. the distribution frame is shown on the left and the subscriber line interface on the right.

FIG. 3 is a block diagram illustrating the interconnection between one of the AAM's 12 and Line Cards within a module 10 serving 60 4-wire subscriber interfaces. The AAM 12 consists of 2 identical relay matrices 12a and 12b, arranged in 2 planes, the alpha and beta plane, one plane for each of the two wire pairs that make up a 4-wire subscriber interface.

Figure 4:
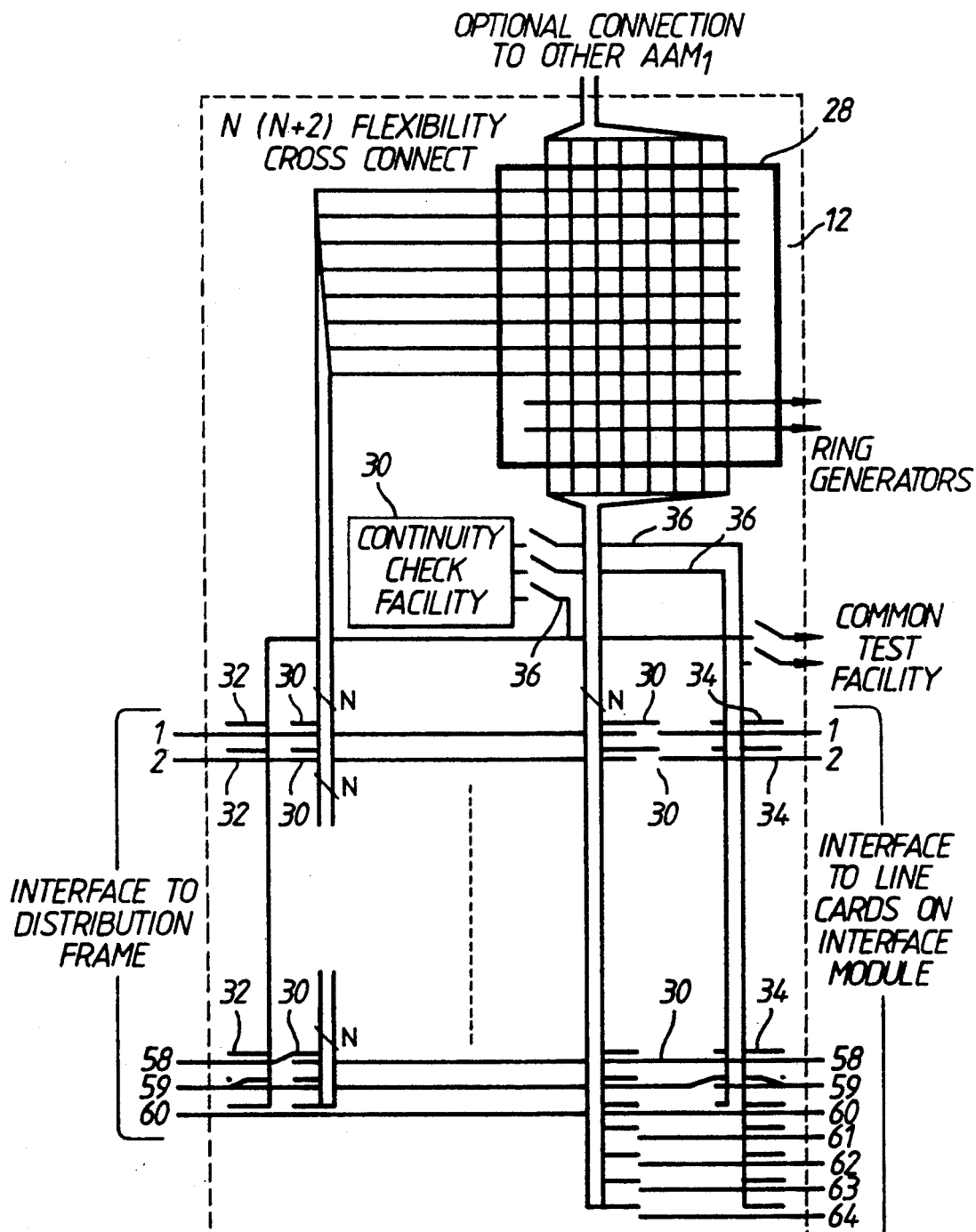

FIG. 4 shows the structure of an AAM 12a or 12b. Each subscriber pair/quad, from the distribution frame, is connected directly through to a line card (see FIG. 3) resulting in a fixed correspondence between connection positions on the distribution frame and physical card positions within the Line Modules 10.

Relays associated with the cross connect and the connection to the cross connect and indicated diagrammatically by reference numeral 30 may be magnetic latching relays. This ensures that the switching matrix stays latched in the absence of power. Relays associated with the test access function, of the test facility 14, however, would be non-latching, such that in their relaxed state, there are no connections to the common line test facility 14 and all splitting relays (described below) are closed.

The two ECCF processors 16, 18 (FIG. 2), configured in a masterslave configuration are connected independently to the central processor 20 using communications links 22 such as HDLC. Each processor 16 or 18 has an independent connection to each of the AAMs 12. Control to each AAM 12 is via separate duplex serial control links 24, using a fully handshaked and error checked message based protocol such as HDLC.

Each processor 16 and 18 maintains a full record of the ECCF configuration in non-volatile memory. In normal operation, both Master and Slave ECCF processors 16, 18 communicate with the DCCH. The master processor 16 is responsible for determining how a particular interconnection requirement is to be implemented using the cross connect matrix 28, and this is confirmed by the slave processor 18. The master processor 16 then initiates the change to the cross connect as appropriate and updates its configuration map. The other processor 18 is informed that the operation has been completed so that its configuration map can also be updated.

In addition to the 'straight through connection' mode described above any 8 subscriber loops and interface circuits within each module 10 can be connected to a flexibility cross point matrix 28. This allows the subscriber pairs access to the excess alternative interface circuits for line sparing and provision of alternative services, i.e. flexibility cross connects.

The arrangement adopted is blocking in that it is not possible to spare any combination of the n subscriber connections to any combination of n line circuits. However, circuit provisioning rules will keep the risk of blocking to a minimum.

There are two ways in which the system can be configured. It can be configured such that change of service or sparing is largely provided using excess line circuits from within the same module with limited provision for sparing, or change of service using interface circuits for another module 10. Alternatively, it can be configured so that the majority os sparing and change of service provision is provided from a common pool of interfaces in a designated module shelf.

If a continuity check fails than the ECCF processor 16 will attempt to set up an alternative pathway through the flexibility cross-point 28. The new path way is then continuity tested. The result of the second test is then used to generate detailed diagnostic information which is passed to the central processor 20.

If the new pathway through the switch is sound then service is provided to the subscriber using a new pathway, and the cross point map is updated to reflect the failure and new matrix configuration.

If it is still not possible to provide service, the central processor 20 is informed so that alternative action can be taken.

The structure has been designed to allow evolution towards a larger number of cross connects, both within a module shelf and between modules. This will become possible when solid state switching technology has evolved to a stage where this can be implemented cost effectively within the cabinet volume.

It is also possible to operate 2 AAMs 12 in parallel to each 60 line module 10. This would permit up to 16 cross connects within a module using the AAMs as proposed. This would also have the advantage that an AAM 12 could be removed without disrupting service to the customers because all the traffic could be handled by the other AAM 12. The tolerance to single point failures would also be improved.

I claim:

1. An electronic cross connect frame, for an exchange or a multiplexer thereof, comprising an analogue access matrix having an integral number n+x subscriber line interfaces and an integral number n interface connections to a distribution frame, the matrix being capable of switching, on a one-one basis, up to 2x of the subscriber line interfaces to any of the interface connections to the distribution frame, and control means associated with the matrix for switching a subscriber interface to an interface connection to the distribution frame and for mapping the paths from the subscriber line interfaces to the interface connections to the distribution frame.

2. An electronic cross connect frame as claimed in claim 1 wherein the x excess subscriber line interfaces are connected to similar or different interface cards whereby "sparing" or alternative services may be provided.

3. An electronic cross connect frame as claimed in claim 1 wherein the analogue access matrix comprises first and second switch planes.

4. An electronic cross connect frame as claimed in claim 3 wherein the first and second switch planes are identical.

5. An electronic cross connect frame as claimed in claim 3 wherein a first pair of conductors of a 4-wire line is switched by the first switch plane and the second pair of conductors of the 4-wire line is switched by the second switch plane.

6. An electronic cross connect frame as claimed in claim 3 wherein the wires of a 2-wire line are switched by the first switch plane and the second switch plane is used to connect the line to a ring source.

7. An electronic cross connect frame as claimed in claim 4 wherein the second switch plane parallels the first switch plane, for a 2-wire line.

8. An electronic cross connect frame as claimed in claim 1 wherein the control means comprises a master and a slave processor, the master processor determining a switching path from one of the subscriber line interfaces to one of the interface connections to the distribution frame, implementing the switching path, and mapping the switching path, and the slave processor confirming the determination and implementation, and separately mapping said switching path.

9. An electronic cross connect frame as claimed in claim 1 wherein incoming lines of an exchange are assigned to modules, each module having an analogue access matrix.

10. An electronic cross connect frame as claimed in claim 9 having a common control means for the modules and their analogue access matrices.

11. An electronic cross connect frame as claimed in claim 10 wherein the x excess subscriber line interfaces are available to a plurality of the modules.

12. An electronic cross connect frame as claimed in 8 wherein the master and slave processors interface with a common control processor of an exchange.

13. An exchange or a multiplexor therefor having an electronic cross connect frame as claimed in claim 1.

* * * * *